(12) United States Patent
Zheng et al.

(10) Patent No.: US 10,089,369 B2
(45) Date of Patent: Oct. 2, 2018

(54) SEARCHING METHOD, SEARCHING APPARATUS AND DEVICE (71) Applicant: BAIDU ONLINE NETWORK TECHNOLOGY (BEIJING) CO., LTD., Beijing (CN)

(72) Inventors: Xueshuang Zheng, Beijing (CN); Peng Pu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 325 days.

(21) Appl. No.: 14/893,696

(22) PCT Filed: Jun. 18, 2015

(86) PCT No.: PCT/CN2015/081757
§ 371 (c)(1),
(2) Date: Nov. 24, 2015

(87) PCT Pub. No.: WO2016/115817
PCT Pub. Date: Jul. 28, 2016

(65) Prior Publication Data
US 2016/0378839 A1   Dec. 29, 2016

(30) Foreign Application Priority Data
Jan. 22, 2015   (CN) .......................... 2015 1 0033034

(51) Int. Cl.
G06F 17/30   (2006.01)
G09G 5/32   (2006.01)

(52) U.S. Cl.
CPC .. *G06F 17/30554* (2013.01); *G06F 17/30477* (2013.01); *G06F 17/30528* (2013.01); *G06F 17/30864* (2013.01); *G06F 17/30867* (2013.01); *G09G 5/32* (2013.01)

(58) Field of Classification Search
CPC .................................................. G06F 17/30554
USPC .................................................. 707/722, 749
See application file for complete search history.

(56) References Cited

U.S. PATENT DOCUMENTS

| | | | | |
|---|---|---|---|---|
| 2011/0314077 | A1* | 12/2011 | Pala | G06Q 30/06 709/202 |
| 2012/0124062 | A1* | 5/2012 | Macbeth | G06F 9/445 707/749 |

FOREIGN PATENT DOCUMENTS

| | | |
|---|---|---|
| CN | 101888416 | 11/2010 |
| CN | 102930017 | 2/2013 |
| CN | 103164442 | 6/2013 |
| CN | 103702143 | 4/2014 |
| CN | 104615688 | 5/2015 |
| JP | 2002175243 A | 6/2002 |

(Continued)

OTHER PUBLICATIONS

European Patent Office, Extended European Search Report for EP15791234.5, dated Jan. 31, 2017.

(Continued)

*Primary Examiner* — Chelcie L Daye
(74) *Attorney, Agent, or Firm* — Hodgson Russ LLP (57) ABSTRACT

A searching method, a searching apparatus and a device are provided. According to embodiments of the present disclosure, a first query input from a client is obtained; attribute information of a terminal where the client runs is obtained; and hence a first search result is obtained according to the first query and the attribute information.

15 Claims, 2 Drawing Sheets

Obtaining a first query input by a user in a client — S101

Obtaining attribute information of a terminal where the client runs — S102

Obtaining a first search result according to the first query and the attribute information — S103

(56) References Cited

FOREIGN PATENT DOCUMENTS

| JP | 2007122290 A | 5/2007 |
|---|---|---|
| JP | 2010039781 | 2/2010 |

OTHER PUBLICATIONS

Japan Patent Office, Notifications of Reasons for Refusal for JP2016-570155, dated May 9, 2017.
Japan Patent Office, Notifications of Reasons for Refusal for JP2016-570155, dated Aug. 8, 2017.
International Searching Authority, International Search Report for PCT/CN2015/081757 dated Aug. 26, 2015.

* cited by examiner

SEARCHING METHOD, SEARCHING APPARATUS AND DEVICE

CROSS-REFERENCE TO RELATED APPLICATION

This application is a national phase entry under 35 USC § 371 of International Application PCT/CN2015/081757, filed Jun. 18, 2015, which claims priority to Chinese Patent Application Serial No. 201510033034.5, titled "Searching Method and Apparatus" filed with the State Intellectual Property Office of P. R. China on Jan. 22, 2015, the entire contents of which are incorporated herein by reference.

FIELD

Embodiments of the present disclosure generally relate to a field of Internet technology, and more particularly to a searching method, a searching apparatus and a device.

BACKGROUND

Currently, when a search function is used, the search requirement of a user may be sometimes related to a terminal used, for example, an application download requirement, and problem search associated with the terminal. In such a case, when different terminals are used and the desired search result is related to the terminal, the search result related to the terminal needs to be presented in a suitable position among all the search results, so as to satisfy the search requirement of the user.

However, in the prior art, the search results obtained according to the queries are the same if identical queries are input from the same client at different terminals, which does not involve any processing about the search results at different terminals. As a result, the accuracy of the search result obtained is relatively low.

SUMMARY

Accordingly, embodiments of the present disclosure provide a searching method, a searching apparatus, a device and a non-volatile computer storage medium, in order to improve the accuracy of the search result.

A first aspect of the embodiments of the present disclosure provides a searching method. The method includes: obtaining a first query input by a user in a client; obtaining attribute information of a terminal where the client runs; and obtaining a first search result according to the first query and the attribute information.

According to the first aspect and any possible implementation, an implementation is further provided. The step of obtaining the first search result according to the first query and the attribute information includes: searching in a webpage database according to the first query to obtain a second search result corresponding to the first query; obtaining a third search result related to the terminal where the client runs from the second search result according to the attribute information; and adjusting a displaying position of the third search result in the second search result to obtain the first search result.

According to the first aspect and any possible implementation, an implementation is further provided. The step of obtaining the first search result according to the first query and the attribute information includes: obtaining a second query according to the first query and the attribute information; and searching in a webpage database according to the second query to obtain a fourth search result corresponding to the second query, so as to use the fourth search result as the first search result.

According to the first aspect and any possible implementation, an implementation is further provided. The step of obtaining the attribute information of the terminal where the client runs includes: obtaining user agent information carried in a search request sent by the client according to the search request; and obtaining the attribute information of the terminal where the client runs from the user agent information.

According to the first aspect and any possible implementation, an implementation is further provided. The step of obtaining the third search result related to the terminal where the client runs from the second search result according to the attribute information includes: obtaining tag information of each search result in the second search results from the webpage database, the tag information being configured to indicate attribute information of a terminal to which a resource provided by the each search result can be applied; and obtaining a fifth search result which provides the resource which can be applied to the terminal where the client runs from the second search result according to the attribute information and the tag information of the each search result, to use the fifth search result as the third search result.

According to the first aspect and any possible implementation, an implementation is further provided. The step of adjusting the displaying position of the third search result in the second search result to obtain the first search result includes: increasing a weight value of the third search result, or decreasing weight values of other search results, except the third search result, in the second search result; sorting each search result of the second search result in a descending order of the weight value to obtain a sorting result, and using the sorting result as the first search result.

According to the first aspect and any possible implementation, an implementation is further provided. The step of adjusting the displaying position of the third search result in the second search result to obtain the first search result includes: exchanging the displaying position of the third search result with displaying positions of other search results in the second search result, in which the displaying positions of other search results are ahead of the displaying position of the third search result in the second search result.

According to the first aspect and any possible implementation, an implementation is further provided. The attribute information includes at least one of the following information: type information of an operating system at the terminal where the client runs and device type information of the terminal.

A second aspect of the embodiments of the present disclosure provides a searching apparatus. The apparatus includes: a first query inputting unit configured to input a first query by a user in a client; an attribute obtaining unit configured to obtain attribute information of a terminal where the client runs; and a search processing unit configured to obtain a first search result according to the first query and the attribute information.

According to the second aspect and any possible implementation, an implementation is further provided. The search processing unit is specifically configured to search in a webpage database according to the first query to obtain a second search result corresponding to the first query; to obtain a third search result related to the terminal where the client runs from the second search result according to the attribute information; and to adjust a displaying position of the third search result in the second search result to obtain the first search result.

According to the second aspect and any possible implementation, an implementation is further provided. The search processing unit is specifically configured to obtain a second query according to the first query and the attribute information; and to search in a webpage database according to the second query to obtain a fourth search result corresponding to the second query, so as to use the fourth search result as the first search result.

According to the second aspect and any possible implementation, an implementation is further provided. The attribute obtaining unit is specifically configured to obtain user agent information carried in a search request sent by the client according to the search request; and to obtain the attribute information of the terminal where the client runs from the user agent information.

According to the second aspect and any possible implementation, an implementation is further provided. When the search processing unit is configured to obtain the third search result related to the terminal where the client runs from the second search result according to the attribute information, the search processing unit is specifically configured to obtain tag information of each search result in the second search results from the webpage database, the tag information being configured to indicate attribute information of a terminal to which a resource provided by the each search result can be applied; and to obtain a fifth search result which provides the resource which can be applied to the terminal where the client runs from the second search result according to the attribute information and the tag information of the each search result, to use the fifth search result as the third search result.

According to the second aspect and any possible implementation, an implementation is further provided. When the search processing unit is configured to adjust the displaying position of the third search result in the second search result to obtain the first search result, the search processing unit is specifically configured to increase a weight value of the third search result, or decrease weight values of other search results, except the third search result, in the second search result; to sort each search result of the second search result in a descending order of the weight value to obtain a sorting result, and use the sorting result as the first search result.

According to the second aspect and any possible implementation, an implementation is further provided. When the search processing unit is configured to adjust the displaying position of the third search result in the second search result to obtain the first search result, the search processing unit is specifically configured to exchange the displaying position of the third search result with displaying positions of other search results in the second search result, in which the displaying positions of other search results are ahead of the displaying position of the third search result in the second search result.

According to the second aspect and any possible implementation, an implementation is further provided. The attribute information includes at least one of the following information: type information of an operating system at the terminal where the client runs and device type information of the terminal.

A third aspect of the embodiments of the present disclosure provides a device. The device includes: one or more processors, a memory, and one or more programs stored in the memory and when executed by the one or more processors, configured to obtain a first query input by a user in a client, to obtain attribute information of a terminal where the client runs, and to obtain a first search result according to the first query and the attribute information.

A fourth aspect of the embodiments of the present disclosure provides a non-volatile computer storage medium. The non-volatile computer storage medium includes one or more programs stored therein. When the one or more programs are executed by a device, the device is configured to obtain a first query input by a user in a client; obtain attribute information of a terminal where the client runs; and obtain a first search result according to the first query and the attribute information.

According to the above technical solution, the embodiments of the present disclosure have the following advantageous effects.

In the technical solution provided by the embodiments of the present disclosure, the first search result is obtained according to the first query input by the user and the attribute information, such that the search result obtained is corresponding to both the query input and the terminal of the client. When the search requirement of the user is related to the attribute of the terminal used by the user, it is possible to timely obtain a search result capable of meeting the search requirement. Consequently, the relevance of the search result recalled may be enhanced, so as to improve the accuracy of the search result recalled and the search efficiency.

BRIEF DESCRIPTION OF THE DRAWINGS

In order to explain the technical solution of the embodiments of the present disclosure, drawings used in the embodiments will be descried in brief. Evidently, the drawings illustrated in the following present some embodiments of the present disclosure. It is possible for those skilled in the art to acquire other drawings according to these drawings, which does not involve any creative effort.

DETAILED DESCRIPTION

Embodiments of the present disclosure will be described in detail with reference to the drawings, so as to appreciate the technical solution of the present disclosure.

The embodiments described herein are just part of the embodiments of the present disclosure, not including all the embodiments of the present disclosure. Based on the embodiments of the present disclosure, other embodiments acquired without any creative effort belong to the protection scope of the present disclosure.

Terms used in the embodiments of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise.

It should also be understood that, as used herein, the term "and/or" represents an association relationship of associated items and contains three kinds of relationship. For example, "A and/or B" may represent the presence of A alone, the presence of A and B together, or the presence of B alone. In addition, the character "/" generally represents an "or" relationship of the associated items.

It should also be understood that, terms such as "first" and "second" are used herein for describing queries, but are not construed to limit the queries. The terms are only used for distinguishing one query from another query. For example, a first query may also be called a second query, and similarly, the second query may also be called the first query, without departing from the scope of the present disclosure.

As used herein, the term "if" may be construed to mean "when" or "upon" or "in response to determining" or "in accordance with a determination" or "in response to detecting," depending on the context. Similarly, the phrase "if it is determined" or "if it is detected [that a stated condition precedent is true]" may be construed to mean "upon determining" or "in response to determining" or "upon detecting" or "in response to detecting" that the stated condition precedent is true, depending on the context.

Embodiment 1

Figure 1:
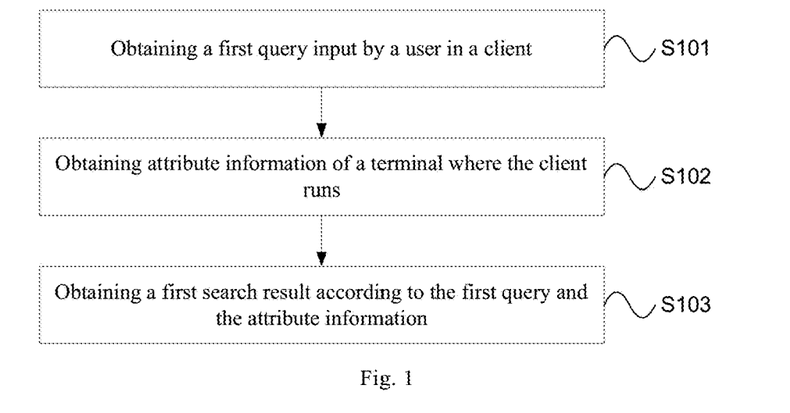
FIG. 1 is a flow chart of a searching method according to an embodiment of the present disclosure.

The embodiment of the present disclosure provides a searching method. Referring to FIG. 1 that is a flow chart of a searching method according to an embodiment of the present disclosure, the method includes the following steps.

In step 101, a first query input by a user in a client is obtained.

In step 102, attribute information of a terminal where the client runs is obtained.

In step 103, a first search result is obtained according to the first query and the attribute information.

It shall be noted that the terminal involved in the embodiment of the present disclosure may include but not be limited to a personal computer (PC), a personal digital assistant (PDA), a wireless handheld device, a tablet computer, a mobile phone, a MP3 player, a MP4 player, etc.

It shall be noted that the execution body of step 101 to step 103 may be a searching apparatus. The apparatus may be an application located at the local terminal, or may be a functional unit of the application located at the local terminal, such as a plug-in or a software development kit (SDK), or may be located in a server, which will not be limited in the embodiment of the present disclosure.

It can be understood that the application may be a native App installed at a terminal, or may be a web App of a browser at a terminal, which will not be limited in the embodiment of the present disclosure.

Embodiment 2

Based on the searching method provided by Embodiment 1, this embodiment further explains the step 101. The step of obtaining a first query input by a user in a client may specifically include but not be limited to: for example, receiving a search request sent by the client, in which the first query input from the client is carried in the search request. Thus, it is possible to obtain the first query according to the search request sent by the client.

For instance, the client may receive a first query "WeChat" input by the user, and send a search request carrying the first query "WeChat" to initiate a search operation regarding the first query "WeChat", so as to obtain a search result.

Embodiment 3

Based on the searching method provided by Embodiment 1 and Embodiment 2, this embodiment further explains the step 102. The step of obtaining the attribute information may specifically include but not be limited to: for example, obtaining user agent information carried in the search request according to the search request sent by the client, and thus obtaining the attribute information from the user agent information.

Alternatively, in this embodiment of the present disclosure, the attribute information may include at least one of the following information but not be limited to: type information of an operating system at the terminal where the client runs and device type information of the terminal.

Alternatively, it is possible to determine whether the search requirement of the user is related to the attribute according to the first query input from the client before the attribute information is obtained. For example, it is possible to determine whether the first query includes a title and/or a keyword (e.g. "download") of the application according to the first query, or whether the first query is a question concerning the terminal. If the first query includes the title and/or any keyword (e.g. "download") of the application, or belongs to a question concerning the terminal, it may be determined that the search requirement of the user is related to the attribute, so as to obtain the attribute information. On the contrary, if the first query does not include the title and/or any keyword (e.g. "download") of the application, or does not belong to a question concerning the terminal, it may be determined that the search requirement of the user is not related to the attribute, so as to obtain the search result corresponding to the first query by directly searching in a webpage database according to the first query instead of obtaining the attribute information.

Alternatively, the type information of the operating system at the terminal where the client runs may include but not be limited to: iPhone Operating System (iOS), Android Operating System, or Symbian Operating System.

For example, the device type information may be brand type information, such as iPhone, Huawei, Samsung, MiOne, etc; or may be device model information, such as iPhone, iPad or iTouch.

It shall be noted that the received search request from the client may also include user agent (UA) information besides the first query input from the client, and the UA information may include but not be limited to: an identifier of the client, an operating system identifier, device type information, an encryption level identifier, a rendering engine identifier and client version information. Therefore, in this embodiment of the present disclosure, it is possible to obtain the UA information carried in the search request according to the search request sent by the client, and thus to determine the type information of the operating system at the terminal where the client runs according to the operating system identifier carried in the UA information, or to obtain the device type information of the terminal according to the UA information.

For example, the UA information carried in the search request is:

Safari iOS 4.33-iPhone

User-Agent: Mozilla/5.0 (iPhone; U; CPU iPhone OS 4_3_3 like Mac OS X; en-us).

It may be determined according to the UA information that the type information of the operating system at the terminal where the client runs is iPhone OS, and the device type information of the terminal is iPhone.

Embodiment 4

Based on the searching method provided by Embodiment 1, Embodiment 2 and Embodiment 3, this embodiment further explains the first implementation of step 103. The step of obtaining the first search result according to the first query and the attribute information may include but not be limited to: first, searching in a webpage database according to the first query to obtain a second search result corresponding to the first query; then obtaining a third search result related to the terminal where the client runs from the second search result according to the attribute information; finally adjusting a displaying position of the third search result in the second search result to obtain the first search result.

Alternatively, it is possible to search in the webpage database according to the first query, so as to find out all the webpages containing the first query from the webpage database and to sort all the webpages according to a ranking algorithm. Thus, the webpages obtained after sorting are used as the second search result corresponding to the first query.

Alternatively, the step of obtaining the third search result related to the terminal where the client runs from the second search result according to the attribute information may include: first, obtaining tag information of each search result in the second search results from the webpage database, the tag information being configured to indicate attribute information of a terminal to which a resource provided by the each search result can be applied; and obtaining a fifth search result which provides the resource which can be applied to the terminal where the client runs from the second search result according to the attribute information and the tag information of the each search result, so as to use the fifth search result as the third search result.

Alternatively, each webpage in the webpage database may be labeled in advance. The tag information of each webpage may include: whether the webpage provides a resource, and attribute information of a terminal to which the resource provided by the webpage may be applied when the webpage provides the resource. Consequently, the tag information may be configured to indicate the attribute information of the terminal to which the resource provided by the webpage may be applied. In such a way, when it is necessary to find out the third search result from the second search result, the tag information of each search result may be obtained from the webpage database.

For example, it may be labeled whether the webpage provides a resource, such as download resources, problem solving resources, etc. If the resources are available in the webpage, it may be further labeled whether the resources provided by the webpage are applicable to iPhone operating system or Android operating system.

Alternatively, the step of adjusting the displaying position of the third search result in the second search result to obtain the first search result may include three ways.

The first way involves: increasing a weight value of the third search result, sorting each search result of the second search result in a descending order of the weight value to obtain a sorting result, and using the sorting result as the first search result.

For example, it is possible to multiply the original weight value of the third search result with an adjustment coefficient of larger than 1, or to add an adjustment amount to the original weight value of the third search result, so as to realize the increase in the weight value of the third search result.

Since the weight value of the third search result is increased while weight values of other search results in the second search result do not change, the displaying position of the third search result will rise when the weight values are sorted in a descending order of the weight value, such that the displaying position of the third search result in the first search result will be higher than the displaying position of the third search result in the second search result.

The second way involves: decreasing weight values of other search results, except the third search result, in the second search result; sorting each search result of the second search result in a descending order of the weight value to obtain a sorting result, and using the sorting result as the first search result.

For example, it is possible to multiply the weight values of other search results, except the third search result, in the second search result with an adjustment coefficient of larger than 0 but smaller than 1, or to subtract an adjustment amount from the weight values of other search results, except the third search result, in the second search result, so as to realize the decrease in the weight values of other search results, except the third search result, in the second search result.

Since the weight values of other search results, except the third search result, in the second search result are decreased, while the weight value of the third search result does not change, the displaying position of the third search result will rise when the weight values are sorted in a descending order of the weight value, such that the displaying position of the third search result in the first search result will be higher than the displaying position of the third search result in the second search result.

It shall be noted that the original weight value of each search result in the second search results may be obtained from the webpage database, in which the original weight value of each search result may be determined according to the degree of relevance between the search result and the query.

The third way involves: exchanging the displaying position of the third search result with displaying positions of other search results in the second search result, in which the displaying positions of other search results are ahead of the displaying position of the third search result in the second search result.

For example, the displaying position of the third search result ranks second in the second search result. After the second search result is presented to the user for a certain period, it turns out that the search result firstly selected by the user is the third search result rather than the search result in the first displaying position, which indicates that the third search result is more suitable for the search requirement of the user. Hence, the position of the third search result in the second displaying position may be exchanged with that of the search result in the first displaying position. In this embodiment, the third search result is found out in the second search result and prioritized to be presented, such that the user may obtain the search result capable of satisfying the search requirement when the search requirement is related to the attribute of the terminal used, so as to improve the search efficiency and the accuracy of the search result.

Embodiment 5

Based on the searching method provided by Embodiment 1, Embodiment 2 and Embodiment 3, this embodiment further explains the second implementation of step 103. The step of obtaining a first search result according to the first query and the attribute information may specifically include but not be limited to: obtaining a second query according to the first query and the attribute information; and searching in a webpage database according to the second query to obtain a fourth search result corresponding to the second query, so as to use the fourth search result as the first search result.

Preferably, it is possible to search in the webpage database according to the second query, so as to find out all the webpages containing the second query from the webpage database and to sort all the webpages according to a ranking algorithm. Thus, the webpages obtained after sorting are used as the fourth search result corresponding to the second query.

It can be understood that the second query may consist of the first query and the attribute information, such that the fourth search result corresponding to the second query is equivalent to the first search result corresponding to the first query and the attribute information.

In this embodiment, during obtaining the search result corresponding to the first query, reference is also made to the attribute information, such that the search result obtained is corresponding to the query input and the terminal of the client. Consequently, when the search requirement of the user is related to the attribute of the terminal used, the search result which satisfies the search requirement may be obtained timely, so as to improve the relevance and accuracy of the search result and to raise the search efficiency.

Embodiment 6

Figure 2:
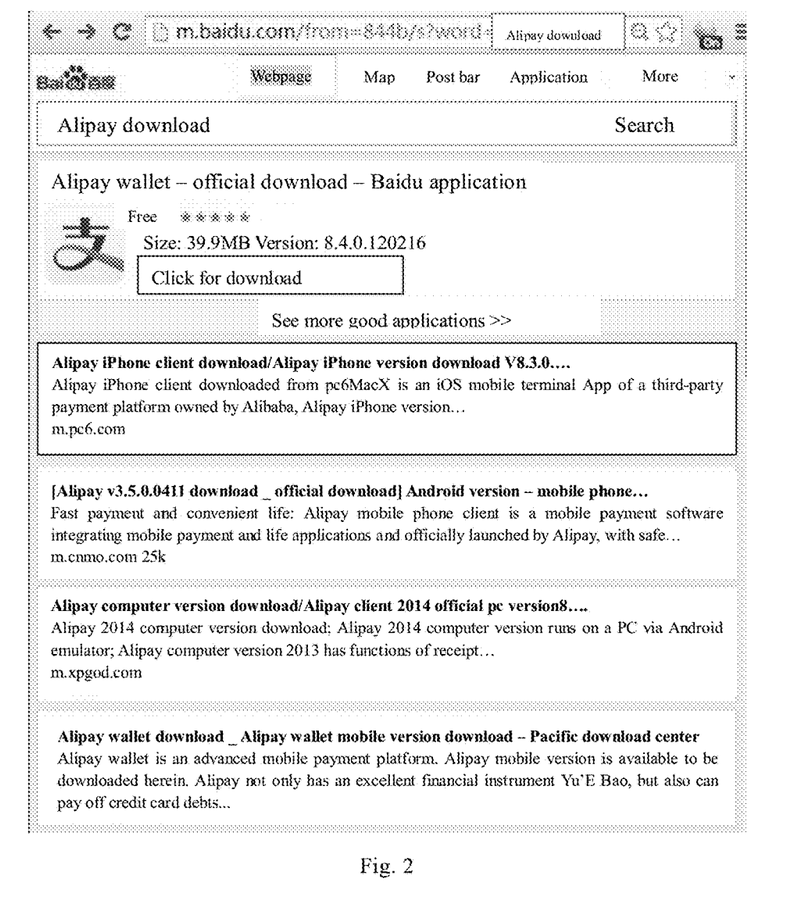
FIG. 2 is a first illustration of a first search result according to an embodiment of the present disclosure.

Referring to FIG. 2 that is a first illustration of a first search result according to an embodiment of the present disclosure, the query input from the client is "Alipay Download" which means that the user wants to download an installation package of "Alipay". Thus, it may be determined that the search requirement of the user is related to the attribute used at present according to the query. Hence, the attribute information used currently may be obtained. The operating system at the terminal where the client runs in FIG. 2 is iOS and the device attribute information of the terminal is iPhone, such that the search result related to the attribute of the terminal is found out in the search result obtained through the search according to the query "Alipay Download", and the search result related to the attribute of the terminal is shown in the first page of the search result pages. As shown in FIG. 2, the search result related to the attribute of the terminal may be displayed in the second displaying position of the first page of the search result pages, such that the user may obtain the desired search result in the first page of search results.

Figure 3:
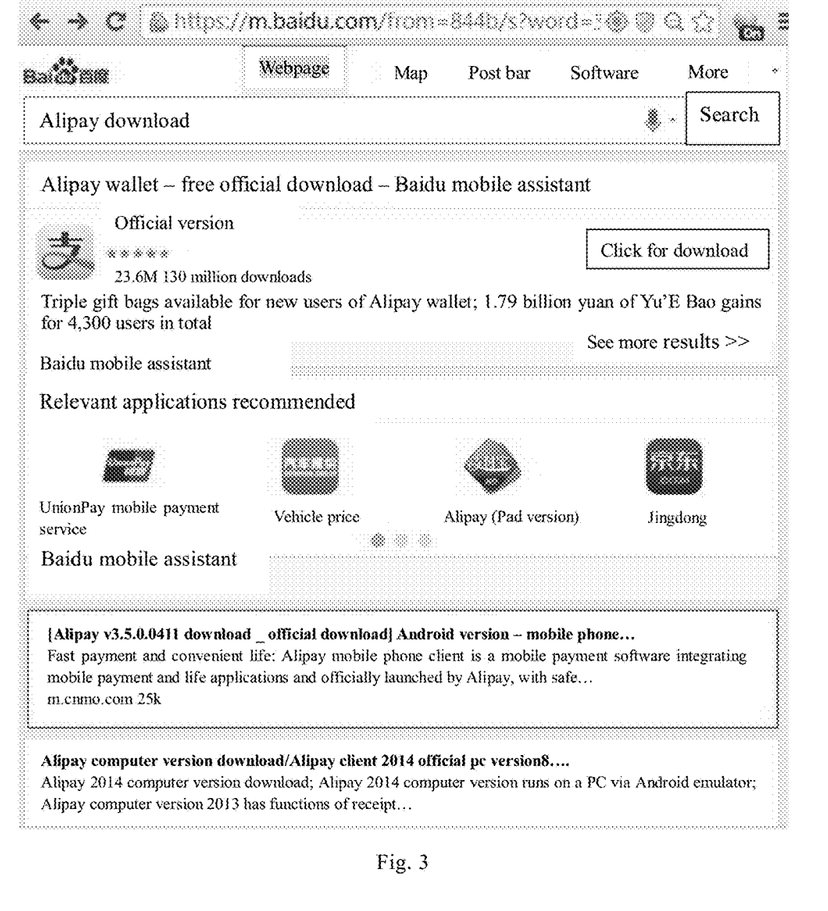
FIG. 3 is a second illustration of a first search result according to an embodiment of the present disclosure.

Referring to FIG. 3 that is a second illustration of a first search result according to an embodiment of the present disclosure, the query input from the client is "Alipay Download" which means that the user wants to download an installation package of "Alipay". Thus, it may be determined that the search requirement of the user is related to the attribute used at present according to the query. Hence, the attribute information used currently may be obtained. The operating system at the terminal where the client runs in FIG. 3 is Android operating system, such that the search result related to the attribute of the terminal is found out in the search result obtained through the search according to the query "Alipay Download", and the search result related to the attribute of the terminal is shown in the first page of the search result pages. As shown in FIG. 3, the search result related to the attribute of the terminal may be displayed in the third displaying position of the first page of the search result pages, such that the user may obtain the desired search result in the first page of search results.

Embodiment 7

The embodiments of the present disclosure further provide an apparatus embodiment for realizing various steps and implementations of the above method embodiments.

Figure 4:
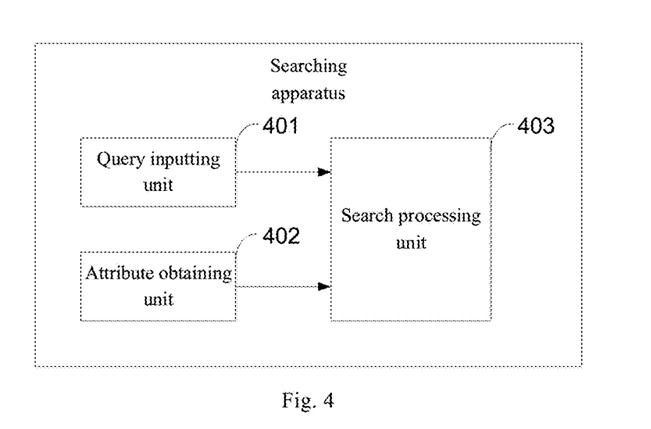
FIG. 4 is a block diagram of a searching apparatus according to an embodiment of the present disclosure.

Referring to FIG. 4 that is a block diagram of a searching apparatus according to an embodiment of the present disclosure, the apparatus includes: a query inputting unit 401 configured to input a first query from a client; an attribute obtaining unit 402 configured to obtain attribute information of a terminal where the client runs; and a search processing unit 403 configured to obtain a first search result according to the first query and the attribute information.

Preferably, the search processing unit 403 is specifically configured to search in a webpage database according to the first query to obtain a second search result corresponding to the first query; to obtain a third search result related to the terminal where the client runs from the second search result according to the attribute information; and to adjust a displaying position of the third search result in the second search result to obtain the first search result.

Preferably, the search processing unit 403 is specifically configured to obtain a second query according to the first query and the attribute information; and to search in a webpage database according to the second query to obtain a fourth search result corresponding to the second query, so as to use the fourth search result as the first search result.

Preferably, the attribute obtaining unit 402 is specifically configured to obtain user agent information carried in a search request sent by the client according to the search request; and to obtain the attribute information of the terminal where the client runs from the user agent information.

Preferably, when the search processing unit 403 is configured to obtain the third search result related to the terminal where the client runs from the second search result according to the attribute information, the search processing unit 403 is specifically configured to: obtain tag information of each search result in the second search results from the webpage database, the tag information being configured to indicate attribute information of a terminal to which a resource provided by the each search result can be applied; and obtain a fifth search result which provides the resource which can be applied to the terminal where the client runs from the second search result according to the attribute information and the tag information of the each search result, to use the fifth search result as the third search result.

Preferably, when the search processing unit 403 is configured to adjust the displaying position of the third search result in the second search result to obtain the first search result, the search processing unit 403 is specifically configured to: increase a weight value of the third search result, or decrease weight values of other search results, except the third search result, in the second search result; and sort each search result of the second search result in a descending order of the weight value to obtain a sorting result and use the sorting result as the first search result.

Preferably, when the search processing unit 403 is configured to adjust the displaying position of the third search result in the second search result to obtain the first search result, the search processing unit 403 is specifically configured to exchange the displaying position of the third search result with displaying positions of other search results in the second search result, in which the displaying positions of other search results are ahead of the displaying position of the third search result in the second search result.

Preferably, the attribute information includes at least one of the following information: type information of an operating system at the terminal where the client runs and device type information of the terminal.

Since each unit in this embodiment may implement the method of FIG. 1, reference may be made to relevant illustration about FIG. 1 for the part of this embodiment briefly described.

The technical solution according to the embodiments of the present disclosure has the following advantageous effects.

In the technical solution provided by the embodiments of the present disclosure, the first search result is obtained according to the first query input by the user and the attribute information, such that the search result obtained is corresponding to both the query input and the terminal of the client.

The prior art gives a technical solution where identical search results are obtained when identical queries are input from the same client at different terminals. When the search requirement of the user is related to the attribute of the terminal used, this technical solution cannot satisfy the search requirement, and the user needs to input the query again or to screen the desired search result page by page. However, according to the embodiments of the present disclosure, when the search requirement of the user is related to the attribute of the terminal used by the user, it is possible to timely obtain a search result capable of meeting the search requirement. Consequently, the relevance of the search result recalled may be enhanced, so as to improve the accuracy of the search result recalled and the search efficiency, and to satisfy the search requirement of the user timely with better search experience.

It shall be appreciated that the specific working process of the system, the apparatus and the units may refer to the corresponding part of the above method embodiments for the convenience of description and simplicity, which will not be further elaborated herein.

It shall be understood that the system, the apparatus and the method disclosed in the embodiments of the present disclosure herein may be implemented in other manners. For example, the apparatus embodiment described above is only explanatory; the units are divided by logical functions, so they may be divided in another manner in practice; a plurality of units or modules may be combined or integrated to another system, or some features may be ignored or not be implemented. Moreover, the coupling or direct coupling or communication connection shown or discussed herein may be achieved via some interfaces; the indirect coupling or communication connection between the apparatuses or the units may be in an electrical, mechanical or other form.

The units described as separate components may be or not be physically separated; the components shown as units may be or not be physical units, i.e. located at a position or distributed at a plurality of network units. Part or all of the units may be selected according to the practical requirement to achieve the purpose of the embodiments.

In addition, individual functional units in the embodiments of the present disclosure may be integrated in one processing module or may be separately physically present, or two or more units may be integrated in one module. The integrated module as described above may be achieved in the form of hardware, or may be achieved in the form of hardware and software functional units.

The integrated unit achieved in the form of a software functional unit may be stored in a computer readable storage medium. The software functional unit is stored in a storage medium, including several instructions to make a computer device (such as a PC, a server, or a network device) or a processor to implement partial steps of the method of each embodiment of the present disclosure. The storage medium may include any medium capable of storing program codes, such as a USB flash drive, a mobile hard disk, a read only memory (ROM), a random access memory (RAM), a magnetic disk, or an optical disk.

The embodiments are only preferable embodiments of the present disclosure, but are not constructed to limit the present disclosure. Any modifications, alternatives, and improvements without departing from spirit and principles of the present disclosure are contained in the protection scope of the present disclosure.

What is claimed is:

1. A searching method, comprising:
   obtaining a first query input by a user in a client;
   determining whether the first query relates to attribute information of a terminal where the client runs;
   if it is determined that the first query relates to the attribute information of the terminal:
      obtaining the attribute information of the terminal where the client runs; and
      obtaining a first search result according to the first query and the attribute information; and
   if it is determined that the first query does not relate to the attribute information of the terminal:
      obtaining the first search result according to the first query and not the attribute information;
   wherein the first query is an internet search query; and
   wherein obtaining the first search result according to the first query and the attribute information comprises:
      searching in a webpage database according to the first query to obtain a second search result corresponding to the first query;
      obtaining a third search result related to the terminal where the client runs from the second search result according to the attribute information; and
      adjusting a displaying position of the third search result in the second search result to obtain the first search result.

2. The method according to claim 1, wherein obtaining the first search result according to the first query and the attribute information comprises:
   obtaining a second query according to the first query and the attribute information; and
   searching in a webpage database according to the second query to obtain a fourth search result corresponding to the second query, so as to use the fourth search result as the first search result.

3. The method according to claim 1, wherein obtaining the attribute information of the terminal where the client runs comprises:
   obtaining user agent information carried in a search request sent by the client according to the search request; and
   obtaining the attribute information of the terminal where the client runs from the user agent information.

4. The method according to claim 1, wherein obtaining the third search result related to the terminal where the client runs from the second search result according to the attribute information comprises:
   obtaining tag information of each search result in the second search results from the webpage database, the tag information being configured to indicate attribute information of a terminal to which a resource provided by the each search result can be applied; and obtaining a fifth search result which provides the resource which can be applied to the terminal where the client runs from the second search result according to the attribute information and the tag information of the each search result, to use the fifth search result as the third search result.

5. The method according to claim 1, wherein adjusting the displaying position of the third search result in the second search result to obtain the first search result comprises:
increasing a weight value of the third search result, or decreasing weight values of other search results, except the third search result, in the second search result;
sorting each search result of the second search result in a descending order of the weight value to obtain a sorting result, and using the sorting result as the first search result.

6. The method according to claim 1, wherein adjusting the displaying position of the third search result in the second search result to obtain the first search result comprises:
exchanging the displaying position of the third search result with displaying positions of other search results in the second search result;
wherein the displaying positions of other search results are ahead of the displaying position of the third search result in the second search result.

7. The method according to claim 1, wherein the attribute information comprises at least one of the following information: type information of an operating system at the terminal where the client runs and device type information of the terminal.

8. A searching apparatus, comprising:
one or more processors configured to execute one or more software units, the one or more software units including:
a first query inputting unit configured to input a first query from a client and to determine whether the first query relates to the attribute information of the terminal where the client runs;
an attribute obtaining unit configured to obtain attribute information of a terminal where the client runs if the first query inputting unit determines that the first query relates to the attribute information of the terminal; and
a search processing unit configured to:
obtain a first search result according to the first query and the attribute information if the first query inputting unit determines that the first query relates to the attribute information of the terminal; and
obtain the first search result according to the first query and not the attribute information if the first query inputting unit determines that the first query does not relate to the attribute information of the terminal;
wherein the first query is an internet search query; and
wherein the search processing unit is specifically configured to:
search in a webpage database according to the first query to obtain a second search result corresponding to the first query;
obtain a third search result related to the terminal where the client runs from the second search result according to the attribute information; and
adjust a displaying position of the third search result in the second search result to obtain the first search result.

9. The apparatus according to claim 8, wherein the search processing unit is specifically configured to:
obtain a second query according to the first query and the attribute information; and
search in a webpage database according to the second query to obtain a fourth search result corresponding to the second query, so as to use the fourth search result as the first search result.

10. The apparatus according to claim 8, wherein the attribute obtaining unit is specifically configured to:
obtain user agent information carried in a search request sent by the client according to the search request; and
obtain the attribute information of the terminal where the client runs from the user agent information.

11. The apparatus according to claim 8, wherein when the search processing unit is configured to obtain the third search result related to the terminal where the client runs from the second search result according to the attribute information, the search processing unit is specifically configured to:
obtain tag information of each search result in the second search results from the webpage database, the tag information being configured to indicate attribute information of a terminal to which a resource provided by the each search result can be applied; and
obtain a fifth search result which provides the resource which can be applied to the terminal where the client runs from the second search result according to the attribute information and the tag information of the each search result, to use the fifth search result as the third search result.

12. The apparatus according to claim 8, wherein when the search processing unit is configured to adjust the displaying position of the third search result in the second search result to obtain the first search result, the search processing unit is specifically configured to:
increase a weight value of the third search result, or decrease weight values of other search results, except the third search result, in the second search result;
sort each search result of the second search result in a descending order of the weight value to obtain a sorting result, and use the sorting result as the first search result.

13. The apparatus according to claim 8, wherein when the search processing unit is configured to adjust the displaying position of the third search result in the second search result to obtain the first search result, the search processing unit is specifically configured to:
exchange the displaying position of the third search result with displaying positions of other search results in the second search result;
wherein the displaying positions of other search results are ahead of the displaying position of the third search result in the second search result.

14. The apparatus according to claim 8, wherein the attribute information comprises at least one of the following information: type information of an operating system at the terminal where the client runs and device type information of the terminal.

15. A device, comprising:
one or more processors;
a memory;
one or more programs stored in the memory and when executed by the one or more processors, configured to:
obtain a first query input from a client;
determine whether the first query relates to attribute information of a terminal where the client runs;

if it is determined that the first query relates to the attribute information of the terminal:
  obtain the attribute information of the terminal where the client runs; and
  obtain a first search result according to the first query and the attribute information; and
if it is determined that the first query does not relate to the attribute information of the terminal:
  obtain the first search result according to the first query and not the attribute information;
wherein the first query is an internet search query; and
wherein the one or more programs stored in the memory and when executed by the one or more processors, are further configured to:
search in a webpage database according to the first query to obtain a second search result corresponding to the first query;
obtain a third search result related to the terminal where the client runs from the second search result according to the attribute information; and
adjust a displaying position of the third search result in the second search result to obtain the first search result.

\* \* \* \* \*